Nov. 28, 1950  R. H. RANGER  2,531,466
STEREOSCOPIC RADIO LOCATION DEVICE
Filed Aug. 5, 1944  6 Sheets-Sheet 1

Fig.1.

INVENTOR.
Richard H. Ranger
BY
Harry M. Saragovitz
ATTORNEY

Nov. 28, 1950 R. H. RANGER 2,531,466
STEREOSCOPIC RADIO LOCATION DEVICE
Filed Aug. 5, 1944 6 Sheets-Sheet 2

*Fig.2.*

STEREOSCOPIC DESIGN FOR LEFT INDICATOR

INVENTOR.
Richard H. Ranger
BY
Harry M. Saragovitz
ATTORNEY

Nov. 28, 1950  R. H. RANGER  2,531,466
STEREOSCOPIC RADIO LOCATION DEVICE
Filed Aug. 5, 1944  6 Sheets-Sheet 3

Fig.3.

STEREOSCOPIC DESIGN FOR RIGHT INDICATOR

INVENTOR.
Richard H. Ranger
BY
Harry M. Saragovitz
ATTORNEY

Nov. 28, 1950     R. H. RANGER     2,531,466
STEREOSCOPIC RADIO LOCATION DEVICE Filed Aug. 5, 1944     6 Sheets-Sheet 4

INVENTOR.
Richard H. Ranger
BY
Harry M. Saragovitz
ATTORNEY

Nov. 28, 1950  R. H. RANGER  2,531,466
STEREOSCOPIC RADIO LOCATION DEVICE
Filed Aug. 5, 1944  6 Sheets-Sheet 5

INVENTOR
RICHARD H. RANGER
BY William D. Hall
ATTORNEY

Patented Nov. 28, 1950

2,531,466

UNITED STATES PATENT OFFICE 2,531,466

STEREOSCOPIC RADIO LOCATION DEVICE

Richard H. Ranger, Newark, N. J.

Application August 5, 1944, Serial No. 548,289

5 Claims. (Cl. 343—10)

(Granted under the act of March 3, 1883, as amended April 30, 1928; 370 O. G. 757)

The invention described herein may be manufactured and used by or for the Government for governmental purposes, without the payment of any royalty thereon.

This invention relates to radio object-locating systems, and more particularly to improvements in radio locators utilizing plan position indicators for furnishing the desired information concerning the location of targets.

A plan position indicator, hereinafter called PPI, presents a polar coordinate map in terms of range and bearing of all objects "visible" to a radar system. This type of indication may be produced by means of a narrow beam transmitting-receiving antenna array rotated around its vertical axis, and a receiver connected to a cathode ray oscilloscope with a radial sweep synchronously following the rotating antenna. The rotating radial sweep makes an electron beam sweep from the center of a long-persistence fluorescent screen of the cathode ray tube to its outer edge. By starting the radial sweep at the instant of transmitting a radio frequency pulse, the radial distance on the screen of the cathode ray tube is made to represent the range of an object. An angle formed between a reference line and a radial trace through the center of an echo image is made to represent the bearing of an object, or its azimuth, by rotating the radial sweep about the longitudinal axis of the tube in synchronism and in phase with the rotation of the antenna so that the radial sweep and the axis of the antenna lobe always point in exactly the same direction. When a radio frequency pulse from the transmitter strikes an object, some small portion of energy will be reradiated back in the direction of the radio locator receiver, and if the reflected pulse is sufficiently strong, a distinguishable signal or echo is registered by the receiver. These signals are applied to an intensity grid of the cathode ray tube to produce brightening of the cathode ray trace for each echo received. This so-called intensity modulation results in the echoes appearing as bright circular arcs on the fluorescent screen of the oscilloscope. A target appears as a small arc due to the width of the antenna beam as the antenna is rotated in azimuth. The radial distance and the angular position of the center of such arc give respectively the range and the azimuth of the target producing this arc. For obtaining bearing readings, a scale in degrees is usually provided around the periphery of the cathode ray tube screen with a 0° line pointing to the north. Some form of range scale is also provided for determining the range of a target, this scale consisting in some instances of concentric circles engraved on a transparent grating superimposed over the screen of the tube, and in other instances it consists of "marker" signals which intensity-modulate the cathode ray beam so that they appear as bright circles on the oscilloscope screen.

The plan position indicator has the inherent advantage of presenting on the screen of a cathode ray tube the true bearing and range of all targets in the plane in which the antenna is rotating. When the exploratory pulse leaves the antenna, the beam of the cathode ray tube leaves the geometric center of the screen traveling in the same indicated direction as the radiated pulse. A brief time later the echo reaches the receiver and at this instant the output of the receiver intensifies the cathode ray beam which in turn produces a luminuos spot on the screen of the tube. Thus, the distance of the spot from the center is proportional to the range. To obtain azimuth scanning, the antenna is rotated at a uniform angular velocity, and the sweep is made to follow the antenna so that the radial path of the cathode ray beam and the axis of the antenna lobe continuously point in the same direction. The angular position of the spot on the oscilloscope screen represents the true bearing of the object. After completion of the sweep, the cathode ray beam returns to the center of the tube and waits for the next exploratory pulse to leave the antenna.

Frequently, there is superimposed over the screen of the oscilloscope a grid or grating of polar coordinates together with a transparent map of the locality that is being scanned. The map and the grating are ordinarily so oriented that the north-south line coincides with the 0–180° azimuth line of the superimposed grating.

While the usual plan position indicator will indicate the range and azimuth of an object, it gives no indication of the altitude, and it has heretofore been necessary to calculate the altitude.

It is therefore an object of this invention to provide means for determining simultaneously the range, azimuth and altitude of an object.

A further object is the provision of means used in combination with plan position indicators to produce a stereoscopic effect on images of maps to indicate simultaneously the altitude, range and azimuth of an object.

These and other objects are attained by the novel arrangement and construction hereinafter described and illustrated in the accompanying drawings, forming a part hereof and in which:

Figure 3 is a view showing the manner of marking the map for the right eye.

The drawings indicate the echoes by black marks, whereas the normal plan position indicator gives them actually as bright white spots. As a matter of fact this invention works better by reversing the beam modulation control to get dark spots along bright traces to indicate echoes. This bright trace illuminates the transparencies excellently, and the echoes from planes show up as black dots against the transparencies.

The radio locator system comprises a high frequency pulse transmitter and receiver 45 producing pulses which emanate from an antenna 46 and are propagated by a reflector 47. The transmitter and receiver 45 is pivotally mounted on a post 48 for rotary movements in a vertical plane. The post 48 is mounted on a pedestal 59 for rotary movements in a horizontal plane. Attached to the device 45 is a segmental gear 49 in mesh with a pinion 99 which is manually manipulated to cause rotary movements in a vertical plane.

Forming a part of the system are two plan position indicators 9 and 10, which include oscilloscopes having respectively over the faces thereof sheets 11 and 12 of transparent material with transparent maps thereon of the locality being scanned. Positioned between the two devices 9 and 10 is a mirror 13 arranged at an angle to receive images from the device 9.

The plan position indicators 9 and 10 are of a type employing a cathode ray tube in which a cathode ray sweeps back and forth from the center to the edge of the scanning disc, and at the same time is rotated uniformly over a complete circle. The radial motion back and forth of the trace from the center to the edge of the disc is so rapid that the effect is that of a continuous line extending from the center to the edge of the scanning disc, and this line is rotated around the disc with the center of the disc as an axis. When a pulse reflected from an object located is received by the radar device, this pulse appears upon the luminescent scanning disc of the plan position indicator. The distance of the pulse from the center of the disc indicates the range of the object, and the angular position of the pulse from the base north-south line indicates the azimuth of the object.

Figure 2:
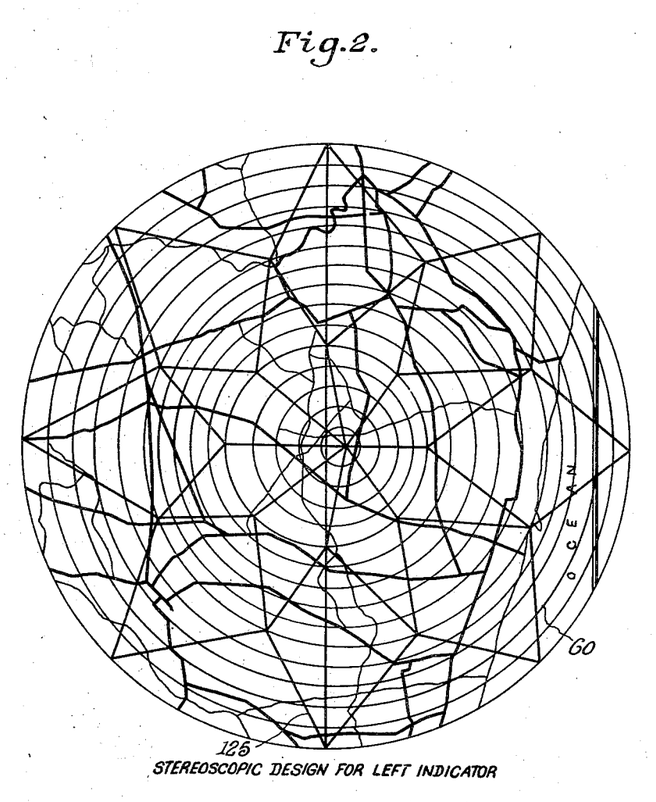
Figure 2 is a view showing the manner in which a map is marked for use in the system for the left eye. (In use, this view is printed on a transparency and the reverse of the map is presented to the mirror to bring the image into correct orientation, as the mirror again reverses the image to make it correct.)
Figure 4:
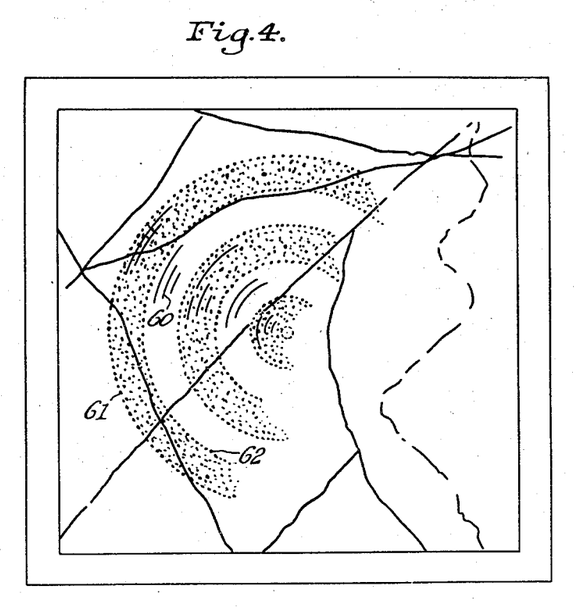
Figure 4 is a view showing the stereoscopic effect produced by the images of the marked maps.
Figure 5:
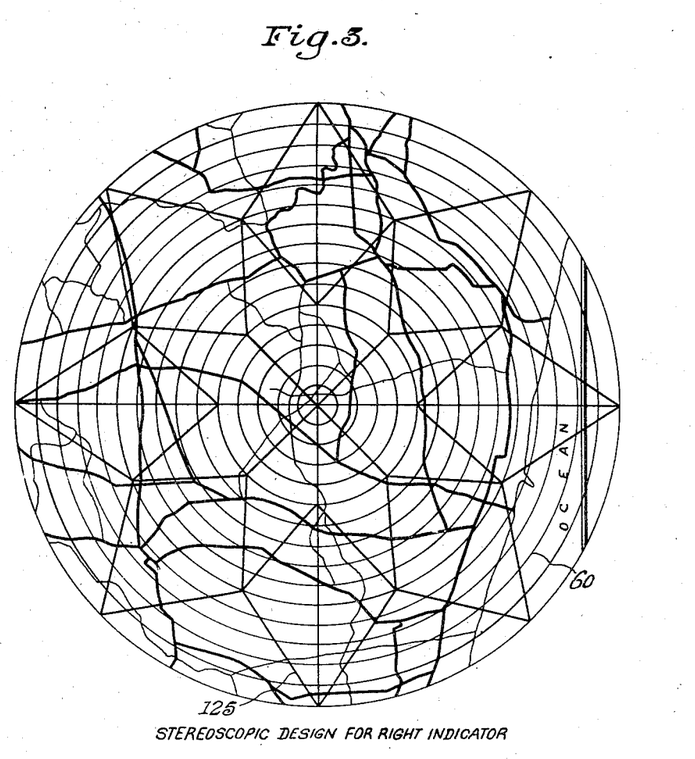
Figure 5 is a view showing a cross section cutaway of the apparent stereoscopic image.

Positioned over the transparent sheets 11 and 12 are transparent maps of the locality being scanned. These maps are shown in Figures 2 and 3. Each map has a plurality of circular contour lines 60 marked thereon. It will be noted that the centers of the circular contour lines for the map of Figure 2 are not concentric as are the circular contour lines for the map of Figure 3. As a modification, the circular contour lines of both maps may be eccentric by approximately one half the amount here shown on just the left so as to secure the desired stereoscopic effect. This eccentricity is such that when the image of the map at 11 in the mirror 13 is viewed simultaneously with a direct view of the map at 12 a stereoscopic effect is produced, and there appears to be a plurality of concentric ridges 61 and valleys 62 (see Figures 4 and 5).

The spaced-apart circles give the effect of a cone rising at the center of the map. The height of this cone at the apex represents 25,000 feet, and it falls in 5,000 foot levels to the ground level at a distance of approximately two miles radius from the center. The contour spacing is then continued radially outward, rising around the central cone. This ridge then falls away again in 5,000 feet levels to the ground, and then rises again to a second ridge, and so on.

In order to enable the eye to pick up the elevations readily, diagonal lines 125 are run between the contour lines representing the bottom and the top elevations. Six points on each such circle are chosen, and the lines run up and down. This helps materially in focusing the eyes.

To determine the proper eccentricity in drawing the circles to give the stereoscopic effect, an imaginary situation has been developed. That is, in looking at any given point the images representing that point for the left eye and the right eye are assumed to be those that would be observed at distances of infinity from the map but still at an angular separation for the eyes as they would be as if they were only 15 inches from the map. This is an important point. At fifteen inches from the map, and with 2½ inches separation of the eyes, the angular divergence from a point on the center of the map to each of the eyes is approximately 9.5 degrees. But this divergence is assumed to be constant and equal for any point on or above the map. This would be the hypothetical situation of having the eyes at infinity but still with this same angular divergence of about 9.5 degrees.

At first, this divergence was distributed equally for the right and left images, but then it was found equally effective to have the angle for one eye to be perpendicular to the map, and all the 9.5 degree divergence used on the other. An arbitrary convention has been made of assuming the image for the right eye is the perpendicular projection of all points above the map, onto the map, and the image for the left eye is made up by projecting all points above the map at an angle of 9.5 degrees off the vertical onto the map.

No account is taken of the fact that in normal stereoscopic effects the eye is at a nearby single point and looks forward and to the left and to the right. This new scheme simplifies the drawing considerably and gives much clearer delineation of the height of each portion above the map. It likewise prevents the great distortions towards the outside of the map which would otherwise occur; and simplifies the adaptation of the idea to actual radar presentations.

Normal stereoscopy is really a combination of perspective in each view and then a varying angular divergence for each portion of the view. This new stereoscopy has been called stereoparallax because it is stereo built up of parallel projections. It has the decided advantage of meaning equal divergence for all points at equal heights above the map. It makes for easier observance and much more definite estimates of height.

Figure 1:
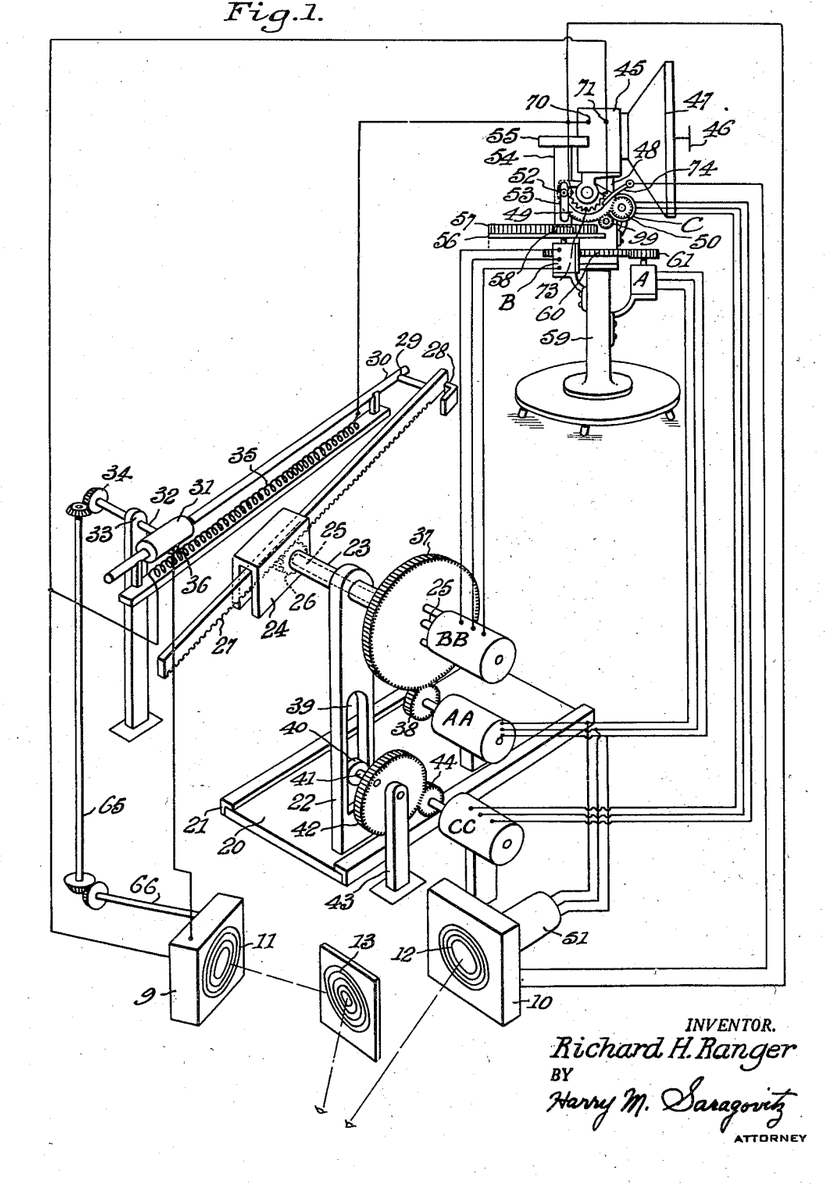
Figure 1 is a schematic diagram of a radio locating system embodying the invention.

For the left eye image, the center of the contour circles is offset to the left (when plan position indicator 9 is viewed directly rather than as reflected by mirror 13) by an amount proportional to the height that a given circle contour is supposed to represent. These centers appear on the right in Figure 2 because this is a front view, as seen through mirror 13 as Figure 1 shows, of the rear of the map constituting transparent sheet 11 placed on plan position indicator 9. As the tangent of 9.5 degrees is approximately one-sixth, it is seen that the eccentricity is one-sixth the elevation to be represented. So, for equal heights, the circular contour lines representing the same height on any of the imaginary ridges in space will have centers displaced to the right of the ground center of the map by an amount representing one-sixth of the height to be indicated.

The net effect of the circles and diagonals is to build up a very delicate illusionary structure of fine lines above the map, looking like a jelly mold.

The presence of the map is a very distinct contribution to the apparent reality of the stereo-presentation. The roads, towns and printing give a well-defined base from which the contour lines appear to rise. The illusion is also helped by having other references at the various heights. Numbers and words indicating the heights are properly spaced to appear to be at the same apparent heights as they indicate.

It is to be noted that for points above the ground the left projections are moved to the left at screen 11. They appear on the right in Figure 2 because this is a front view as reversed by mirror 13. This is to make points nearer the left eye diverge to the right. So the movement to the left on the print actually makes the left eye move to the right to accommodate in focusing the two eyes on the spot.

Figure 6:
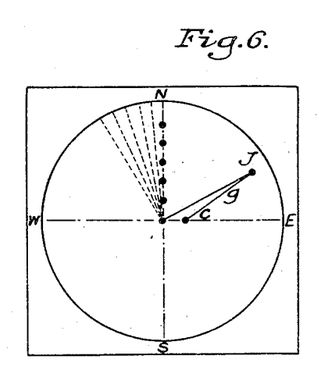
Figure 6 is a view of the screen of an oscilloscope used in a plan position indicator.

It is assumed that the radar is located at the center of this whole presentation and on the ground level. The normal trace will then radiate out from this center (see Figure 6). If the radar is pointed horizontally straight out, the trace should appear as being at zero elevation throughout its length. This would obviously be the normal presentation, as is now accomplished in plan position indicator work. As the radar sweeps around, a Selsyn connection accomplishes the rotation of the position indicator controls to cause the sweep to change angle to correspond to the changing angle of the radar.

Now, assume that the radar is changed from the horizontal position or zero elevation, to some higher position, say 10°. This is accomplished by manually rotating a pinion 99 to cause rotation of the segmental gear 49 (see Figure 1). Starting with the sweep running straight out to the right in an easterly direction from the center of the map, as far as the angles are concerned both the left and right presentations (Figure 6) will be at the same azimuth angle for this particular condition. They will again be at the same azimuth angle when the sweep gets around 180° in a westerly direction. At all other points the two presentations will not coincide.

Considering the right presentation alone, inasmuch as the radar is now directed upward at an angle at 10° it is obvious that as the trace now comes up as well as out, the eye will see a foreshortened projection of this trace on the map and this means that a potentiometer control of the extent of the sweep must be realized when the radar is raised in elevation to this 10° angle. With this presentation the trace will be foreshortened in direct proportion to the cosine of the angle of elevation.

This is modified, however, for the left eye over the right eye. The left eye will see all points which are above the ground level displaced to the right by an amount proportional to their height from the ground. Fortunately, this displacement is absolutely uniform, so that if it is a horizontal circle that we are looking at, it still remains as a complete circle displaced in its entirety to the right by the proportionate amount corresponding to its elevation above the map. Such a circle would be one such contour of space elevation above the ground (see Figure 8).

Now, as the radar device is pointed at an angle south of east and still assuming that the elevation is up 10 degrees, it is obvious that the successive points out along the trace will be increasingly deflected to the right for the left eye observation. This change is exactly proportional to the distance out from the center, so that one adjustment for a given position in elevation and azimuth is all that is necessary for any point on that trace and this is a linear adjustment on the gain response of the scope.

Inasmuch as these points are progressively to the right, it is obvious that for any azimuth position to the right of the north-south vertical line (see Figure 6) the azimuth angle for the left eye presentation will be decreased back towards the horizontal east-west line. As a matter of fact, the angle in any given instance will be at the original angle of declination from east, taken, however, from the displacement center on the east-west axis, corresponding to the height of the furthest point out J on the trace.

In the system shown in Figure 1 the operator views in the mirror the image of the left indicator 11 with the left eye, and looks directly at the right indicator 12 with the right eye.

For the right stereogram, the projection will be a plan view of everything above the ground represented as a vertical projection right down to the map. This is as if the eye were at infinity looking vertically down on the area. For the left image, the one that is viewed through the mirror, proper parallax to the right must be introduced to give the stereoscopic effect. As the mirror reverses the action this requires a shift to the left proportional to the height above the map.

Figure 7:
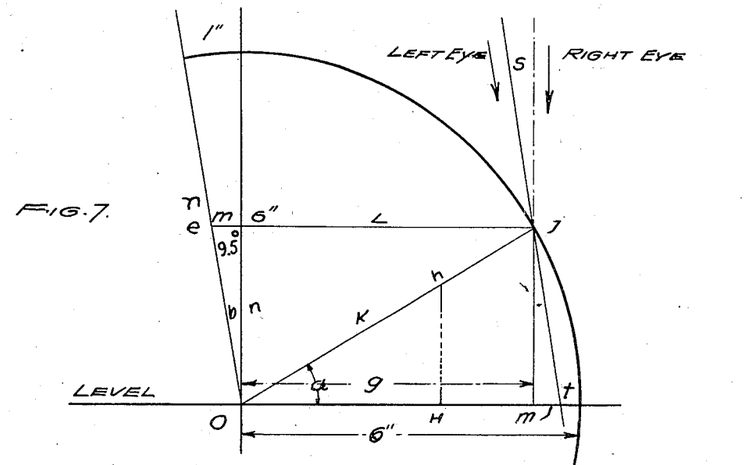
Figures 7 and 8 are diagrams explanatory of the method employed.

Figure 7 is a view showing the appropriate triangulation for points above the line of the map shown as the horizontal line along the bottom. Assume a trace 6 inches long on the plan position indicator for objects on the ground. Then any targets on the ground will show up on the 6-inch trace at the appropriate azimuth in the plane of the map. In other words, this is for zero elevation. Now, suppose the radar is elevated at an angle $a$ shown in Figure 7 to pick up an airplane above the area covered by the map. The same relative position would be indicated as shown by the plane on the line K at h. It is obvious that now the trace on the plan position indicator should be reduced to the length g which is the length out along K times the cosine of angle a.

Every point on the trace which normally represents the full distance K of 6 inches must likewise now be reduced by a potentiometer control which reduces the sweep to this cosine amount, i. e. $g=k \cos a$. So every point will be represented on the ground level as a vertical projection down from the point indicated above the map. The dotted line coming down from h to H indicates this.

For the right stereogram all points will therefore be represented as shown on Figure 7. Figure 3 is a plan view for the right eye and Figure 2 is a plan view for the left eye. For any given azimuth on the right stereogram the trace will be foreshortened by the same amount as indicated in Figure 7, the cosine of the angle times K. A potentiometer for adjusting the sweep voltage can be mounted directly on the elevation control of the radar device.

For the left stereogram, it is necessary to use a compensating arrangement to change the sweep in accordance with the elevation and azimuth angle as well. A mechanical linkage will accomplish this. This is shown in Figure 1.

As stated above, for the left indicator, it is necessary to make a modification in order to get the proper eccentricity to displace things to the right. This eccentricity is necessary because it is assumed that the left eye is looking at a 9.5 degree angle down on the map representing the area being covered by the radar. This means that everything above the plane of the map will be displaced to the right by an appropriate amount proportional to the height of this 9.5 degree factor. The tangent of a 9.5 degree angle is roughly one-sixth which means that for every increase of elevation by six the presentation is moved to the right by one. In other words, there is a ⅙ displacement to the right with respect to increases in elevation.

Figure 7 is a diagram to illustrate a vertical view of the apparent stereoscopic situation above the face of the indicator tube. The base line indicates the cross sectional line of the tube face. It also represents the map placed on the face of the indicator.

Figure 8:
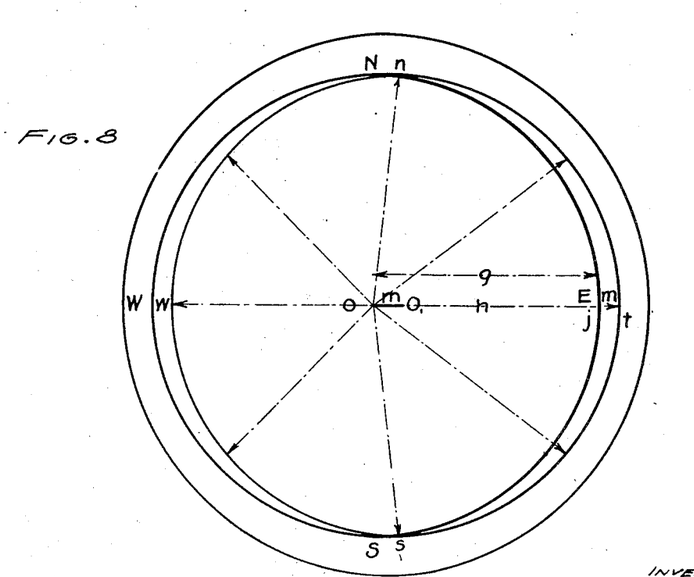

For the left eye, the point $j$ will appear to the right at $t$. It is seen that this point $t$ is an extension of the line $g$ by the amount $m$. This means that for elevation angle $a$, the trace will appear to start from the origin O for the left indicator and travel on an extended distance to the right as shown at point $t$. Figure 8 gives a plan view of this situation where the center is at O. For the right indicator, and elevation angle $a$, the trace will describe a circle whose radius is $g$ out from the center O.

Figure 9:
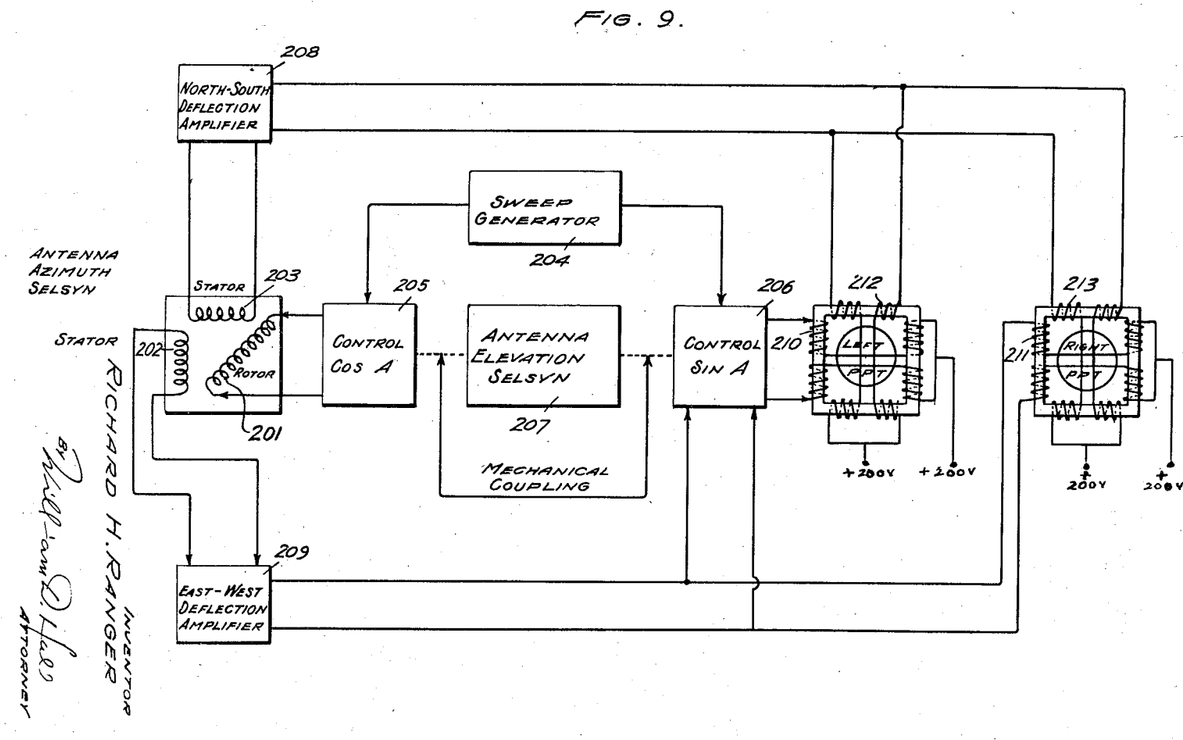
Figure 9 is a block diagram for applying the invention to a modified form of plan position indicator.

For the left indicator, the trace will be biased to the right or east at all times. For elevation angle $a$, the bias will be this amount $m$ at all times. That is, the end of the trace on the left indicator will describe a circle whose center is to the right by the amount $m$, as shown in Figure 9. However, the trace will always start at O.

The extension $m$ equals $n$ times tan $b$, where $n$ is the height of $j$. But $n=K \sin a$. So $m=K \sin a \tan b$. Since tan $b$ is ⅙, $$m=\frac{K}{6} \sin a = \sin a$$

as K equals 6.

Consequently, the left PPI sweep is biased proportionately to the sweep voltage. The sweep will start at O as the no-voltage point, but as the sweep voltage increases the bias will come into action, proportionately to that voltage. As it is always to the right, it comes directly from the sweep voltage generator. It is assumed that the full sweep voltage is such as to carry the sweep to 6 inches. As the maximum bias shift is only to be one inch, the factor to apply to the sweep voltage is therefore $$\frac{\sin a}{6}$$

times the sweep voltage. This bias voltage is added to the normal east-west voltage applied to the horizontal deflecting system of the left indicator. That is, the left PPI is biased with respect to the sine of the angle of elevation as well as to the cosine of the angle of elevation. The right indicator is biased only with respect to the cosine of the angle of elevation.

A mechanical apparatus for controlling the sweep of the left plan position indicator is shown in Figure 1. The apparatus is shown greatly enlarged relative to the plan position indicator. In this apparatus, a bed plate 20 is slidably positioned between guide flanges 21, and has, projecting up therefrom, a post 22 which rotatably supports a sleeve 23 fixed to a casing 24. Rotatably positioned in the sleeve 23 is a shaft 25 fixed to a pinion 26 in mesh with a rack 27. The pinion and rack are positioned in casing 24. Pivot 29 is lower than the pitch line of the rack 27 by an amount equal to the radius of the pitch circle of the gear 26 so that the distance of the pivot point 29 will be uniform and equal to the displacement of the rack caused by rotation of gear 26 in casing 24. The rack 27 has one end bent back on itself at 28, and is rotatable on pin 29, which is also rotatably connected to a rod 30 passing through a short tube 31 which has fixed thereto a shaft 32 rotatably supported by a post 33 and connected to a member 34 which controls the rotation of rotating magnets (not shown) of the left plan position indicator for causing the sweep to rotate about the face of the cathode ray tube as above explained and illustrated in Figure 6. In Figure 1 this connection is indicated by the arm 65 with appropriate bevel gears starting with 34. It is to be noted that counterclockwise rotation of 34 accomplishes clockwise rotation of 66 which is corrected to give the reversed image. It is likewise obvious that these bevel gears could be eliminated and member 34 could operate directly to rotate the magnetic deflecting system of the indicator magnetic rotation.

Supported by the rod 30 is a variable resistance 35 engaging a contact 36 supported by the tube 31.

Fixed to sleeve 23 is a gear 37, in mesh with a pinion 38 fixed to the shaft of a Selsyn motor AA. The post 22 has a slot 39 in which moves a small wheel 40 rotatably mounted on a stub shaft 41 eccentrically fixed to a gear 42 which is rotatably supported by a stationary post 43. The gear 42 is in mesh with a pinion 44 connected to the shaft of a Selsyn motor CC. The shaft 25 passes freely through gear 37 and is connected to the shaft of a Selsyn motor BB, which is mounted on gear 37, the gear and motor rotating together.

This apparatus is associated with a radar device which comprises a radio receiving and transmitting apparatus 45 for emitting very short radio waves from an antenna 46 and projecting them by a reflector 47.

The device is pivotally mounted on a post 48 and carries a toothed segment 49 in mesh with a pinion 50 connected to the shaft of a Selsyn motor C. The segment 49 carries a roller 52 which moves in a slot 53 of a vertical bar 54, of a Scotch yoke, the upper end of which is slidable in a channel 55, and the lower end is slidable on an angle bar 56 and carries a rack 57 in mesh with a pinion 58 connected to the shaft of a Selsyn motor B. The post 48 is rotatably mounted on pedestal 59 and carries a gear 60 in mesh with a pinion 61 connected to the shaft of a Selsyn motor A.

Selsyn motors, A, B, C, are connected respectively to Selsyn motors AA, BB and CC respectively and Selsyn A is also connected to the azimuth Selsyn 51 of the right position indicator 10, to control the rotation of the rotating magnets mentioned above. Selsyn A drives Selsyn AA with gearing to make a one to one rotation of gear 37 with azimuth rotation of the radar. B Selsyn operates Selsyn BB to give a one to one movement of rack 27 with linear movement of Scotch yoke 54, assuming each moves a maximum of six inches. Selsyn C operates Selsyn CC with appropriate gearing to make it a six to one reduction, so movement of post 22 is proportional to one sixth the sine of the angle of elevation.

Terminal 70 of the radar device is connected to one end of resistance 35, to one end of a variable resistance 73 on segment 49, and to right plan position indicator 10. Terminal 71 is connected to the other end of resistance 35, to the left plan position indicator 9, and to the other end of resistance 73. Contact 36 on tube 31 engaging resistance 35 is connected to left indicator 9; and a sliding contact 74 engaging resistance 73 is connected to right indicator 10.

In operation, the horizontal movements of the radar device are transmitted through Selsyn A to Selsyn 51 to control the right indicator 10. These movements are also transmitted from Selsyn A to Selsyn AA to rotate spur gear 38 and thus gear 37, sleeve 23, casing 24, and through bar 27, rod 30, and member 34, to affect the rotation of the left indicator 9.

Vertical movements of the radar device will cause rotary movement of segment 49 to vary the position of the contact 74 on potentiometer 73 and thus affect the applied voltage of the sweep circuit of right indicator 10.

At the same time, movement of segment 49 will rotate pinion 50 to cause Selsyn C to rotate Selsyn CC, which rotates gear 42, by spur gear 44, to cause eccentrically mounted roller 40 to move in slot 39 and move post 22. Since the post 22 is fixed to plate 20, the latter will slide in the guides 21, carrying therewith the structure mounted thereon to cause rod 30 to move in tube 31, and moving contact 36 on the potentiometer 35 to vary the voltage applied to the sweep circuit of the left indicator 9 as above described. The object is to get a direct interpretation of the amount of motion of the bar 54 to the right on Selsyn B. The rack 27 is moved an amount proportionate the movement of bar 54. The bar 54 must move 6 inches for 90 degree vertical rotation to give a 6-inch movement to rack 27 to establish the correct procedure for the length of rack 27 to be proportional to the cosine of the angle of elevation of the radar device. In other words, the distance of pivot 29 is 6 inches out from the center of rotation of sleeve 23 when the radar device is horizontal and it is zero inches out when the radar device is vertical. At all positions its movement is proportional to the cosine of the angle of elevation of the radar.

The azimuth Selsyn A drives Selsyn AA and drives the gear 37 which in turn rotates arm 28 and carries around the rod 30 in an eccentric manner depending upon the lateral separation of support 22 from post 33. This lateral separation is determined by the elevation of the radar, affecting Selsyn CC to rotate gear 42.

For the right plan position indicator, Selsyn C works on a Selsyn 51. The variable resistance 73 on segment 49 controls the gain of the sweep circuit for the right plan position indicator so that the sweep length is proportional to the cosine of the angle of elevation. In order to accomplish this, the resistance 73 must be "tapered" to match the cosine of the angle of elevation. That is, the resistance must be graduated by unit length and not have uniform resistance per unit length.

Most PPI indicators use a pair of deflecting coils which are rotated around the cathode ray tube to produce a rotating sweep. However, if it is desired to avoid the mechanical difficulties involved in this system, the sweep may be rotated by electrical means. As indicated in Figure 9, the antenna azimuth Selsyn is a special type of transformer in which the rotor 201 or primary, is turned mechanically as the antenna is rotated in azimuth. Two stator or secondary windings 202, 203 are placed at right angles to each other. As a result the amplitudes of the induced voltages vary sinusoidally with the rotation of the primary, and the position of the rotor which causes the voltage in stator 202 to be a maximum is 90° away from the position which induces maximum voltage in stator 203. Although the alternations of the voltages induced in the stators are always in phase, the variations of the amplitudes are effectively 90° out of phase because of the 90° separation of the windings. Since the output of stator 202 controls horizontal deflection and the output of stator 203 controls vertical deflection, a circular motion of the spot on the screen of the cathode ray tube is produced as the rotor turns.

Referring to Figure 9, the output of the sweep generator 204, is modified in accordance with the cosine of the angle of elevation by Selsyn control means 207 similar to those shown in Figure 1. This output from the cosine control 205 is delivered to the rotor 201 of the antenna azimuth Selsyn and influences the output of the stator coils. The outputs of the stator coils pass through amplifiers 208, 209 and thence to the right and the left plan position indicators. This is for the radius correction of each plan position indicator in accordance with the cosine of the angle of elevation. However, for the left plan position indicator, it is necessary to introduce an increasing deflection to the right proportionate to $$\frac{\sin a}{6}$$

times the sweep voltage to accomplish the needed eccentricity for the left image. Accordingly, the sweep generator voltage is also passed through a control 206 which varies the sweep voltage in accordance with one sixth the sine of the angle of elevation. After such adjustment, the output of control 206 is a combination of the sweep voltage adjustment first proportionate to the consine of the angle of elevation and second to one sixth the sine of the angle of elevation and the final sweep voltage is passed to the horizontal deflecting coils 210 of the left plan position indicator.

The horizontal deflecting coils 211 of the right plan position indicator are fed directly from amplifier 209. Likewise the vertical deflecting coils 212 and 213, respectively, of the left and the right plan position indicators are fed directly from the amplifier 208. The deflecting coils are mounted on stationary yokes encircling the cathode ray tubes, and rotate the cathode ray.

When the cosine control 205 and the sine control 206 are positioned remotely from the radar device, a Selsyn connection 207 can be used to transmit the elevational movements of the antenna to the control potentiometers at 205 and 206.

I claim:

1. In a stereoscopic device, a left plan position indicator and a right plan position indicator, each of said indicators having stationary vertical and horizontal deflecting coils, a Selsyn transformer having a primary rotor and two stators arranged at right angles to each other, a radio object-locating device having a sweep generator, means for varying the sweep voltage in accordance with the cosine of the angle of elevation of the antenna of the device, said varied voltage being fed to the rotor of the transformer, the output of one of the stators being fed to the vertical deflecting coils of both the indicators, the output of the other stator being fed to the horizontal deflecting coils of the right indicator, and means to vary the sweep voltage in accordance with the sine of the angle of elevation of the antenna of the device, the output of the other stator being added to said last mentioned means and applied to the horizontal deflecting coils of the left indicator.

2. In a radio object-locating device of the type which transmits signals and receives reflections of such signals from objects to be located, the combination of: a directive antenna movable in azimuth and elevation; a left plan position indicator and a right plan position indicator, each indicator comprising a cathode ray tube and a sweep circuit to produce, on the face of said tube, echo images of such objects in polar plan position; potentiometer means connected to said antenna to vary the sweep circuit voltage applied to said indicators to displace the echo image of each indicator from its normal polar position by an amount proportional to the cosine of the angle of elevation of said antenna; means connected to said antenna to further vary the sweep circuit voltage of one indicator to displace the echo image of said one indicator further from its normal polar position by an amount which varies both according to the sine of the angle of elevation and according to the azimuth angle of said antenna; and means associated with the faces of said indicators to produce a stereoscopic effect, said last named means including identical transparent maps on the face of each indicator, a series of spaced concentric circles on the map of said one indicator, and a corresponding series of progressively displaced circles on the map of the other indicator.

3. In a radio object-locating device of the type which transmits signals and receives reflections of such signals from objects to be located, the combination of: a directive antenna movable in azimuth and elevation; a first plan position indicator and a second plan position indicator, each indicator comprising a cathode ray tube and sweep circuit to produce, on the face of the tube, echo images of such objects in polar plan position; a first screen, associated with said first indicator, on which appear indicia representing certain altitudes above the position of the device; a second screen associated with said second indicator on which appear indicia similar to but so displaced from the indicia on the first screen that when the first and second screen are viewed simultaneously by an observer, a stereoscopic effect is produced and the altitude corresponding to an echo image on each of the two screens may be determined; first means for displacing the position of each echo image from its normal polar position by an amount proportional to the cosine of the angle of elevation of said antenna; second means for further displacing the position of the echo image on the second screen in accordance with the sine of the angle of elevation of said antenna; and third means for still further displacing the position of the echo image on the second screen in accordance with the azimuth angle of said antenna.

4. In a radio object-locating device of the type which transmits signals and receives reflections of such signals from objects to be located, the combination of: a directive antenna movable in azimuth and elevation; a first plan position indicator and a second plan position indicator, each indicator comprising a cathode ray tube and a sweep circuit to produce echo images of such objects in polar plan position; a first screen, associated with said first indicator, bearing markings in the form of concentric circles; a second screen, associated with said second indicator, bearing markings in the form of circles, each of the circles on the second screen corresponding to one of the circles on the first screen but having its center displaced from the center of the corresponding circle on the first screen, whereby a stereoscopic effect in altitude is produced; the first plan position indicator being so placed that it may be viewed by only one eye of an observer, while the second plan position indicator is so placed that it may be viewed by only the other eye of the observer; first means for displacing the position of each echo image from its normal polar position by an amount proportional to the cosine of the angle of elevation of said antenna; second means for further displacing the position of the echo image on the second screen in accordance with the sine of the angle of elevation of said antenna; and third means for still further displacing the position of the echo image on the second screen in accordance with the azimuth angle of said antenna.

5. In a radio object-locating device of the type which transmits signals and receives reflections of such signals from objects to be located, and which produces echo images of such objects on one or more plan position indicators, which indicators comprise cathode ray tubes, the combination of: a directive antenna movable in azimuth and elevation; a first plan position indicator having a first screen on which appear indicia representing certain altitudes above the position of the device; a second plan position indicator having a second screen on which appear indicia similar to but so displaced from the indicia on the first screen that when the first and second screens are viewed simultaneously by an observer, a stereoscopic effect is produced and the altitude corresponding to an echo image on each of the two screens may be determined; each indicator having two sets of stationary deflecting coils, the first set serving to move the echo image in one plane, while the second set serves to move the image in a plane at right angles to the first plane; first Selsyn means responsive to the azimuth position of said antenna, said first Selsyn means having a primary rotor winding and first and second stator windings, the two stator windings being at right angles to each other; second Selsyn means responsive to the angle of elevation of said antenna; a sweep voltage generator; first control means responsive to the second Selsyn means for adjusting the sweep voltage in proportion to the cosine of the angle of elevation of said antenna; means for supplying the output of the first control means to the rotor winding of the first Selsyn means; means for supplying the output of the first stator winding of the first Selsyn means to the first set of deflecting coils of both indicators; second control means responsive to the second Selsyn means for adjusting the sweep voltage in proportion to the sine of the angle of elevation of said antenna; means for supplying the output of the second stator winding of the first Selsyn means to the second control means and to the second set of deflecting coils of the first indicator; and means for supplying the output of the second control means to the second set of deflecting coils of the second indicator.

RICHARD H. RANGER.

REFERENCES CITED

The following references are of record in the file of this patent:

UNITED STATES PATENTS

| Number | Name | Date |
| --- | --- | --- |
| 1,743,952 | Barr et al. | Jan. 14, 1930 |
| 2,189,549 | Hershberger | Feb. 6, 1940 |
| 2,209,191 | Dearing | July 23, 1940 |
| 2,227,598 | Lyman et al. | Jan. 7, 1941 |
| 2,333,322 | Levy | Nov. 2, 1943 |
| 2,359,703 | Wood | Oct. 3, 1944 |
| 2,408,848 | Hammond | Oct. 8, 1946 |
| 2,426,979 | Ayres | Sept. 9, 1947 |
| 2,434,897 | Ayres | Jan. 27, 1948 |